May 2, 1933.　　　L. M. HILE　　　1,907,355
BASKET HANDLE MACHINE
Filed Sept. 5, 1931　　8 Sheets-Sheet 1

Inventor:
Leslie M. Hile

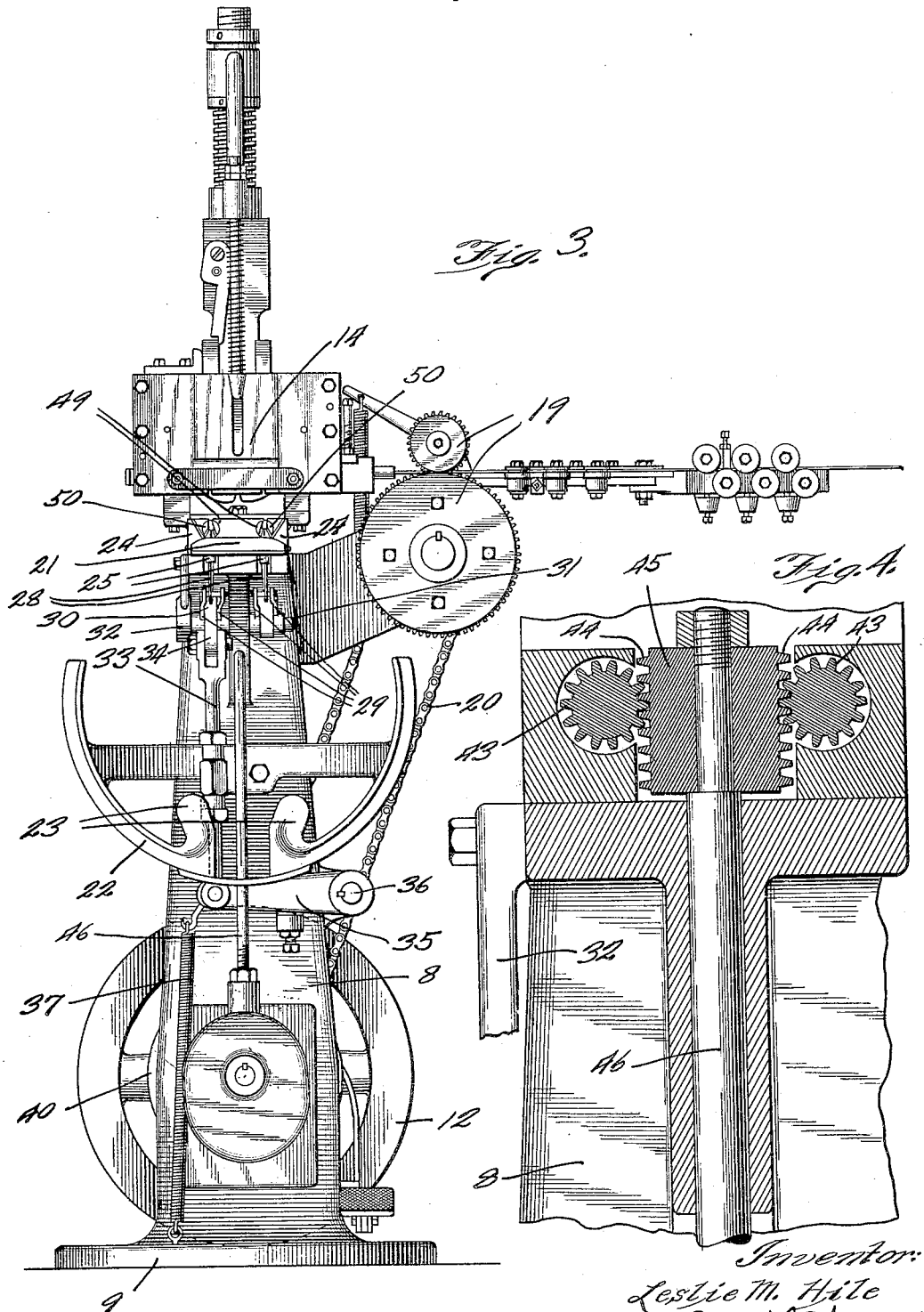

May 2, 1933.  L. M. HILE  1,907,355
BASKET HANDLE MACHINE
Filed Sept. 5, 1931   8 Sheets-Sheet 4

Inventor:
Leslie M. Hile

May 2, 1933.    L. M. HILE    1,907,355
BASKET HANDLE MACHINE
Filed Sept. 5, 1931    8 Sheets-Sheet 5
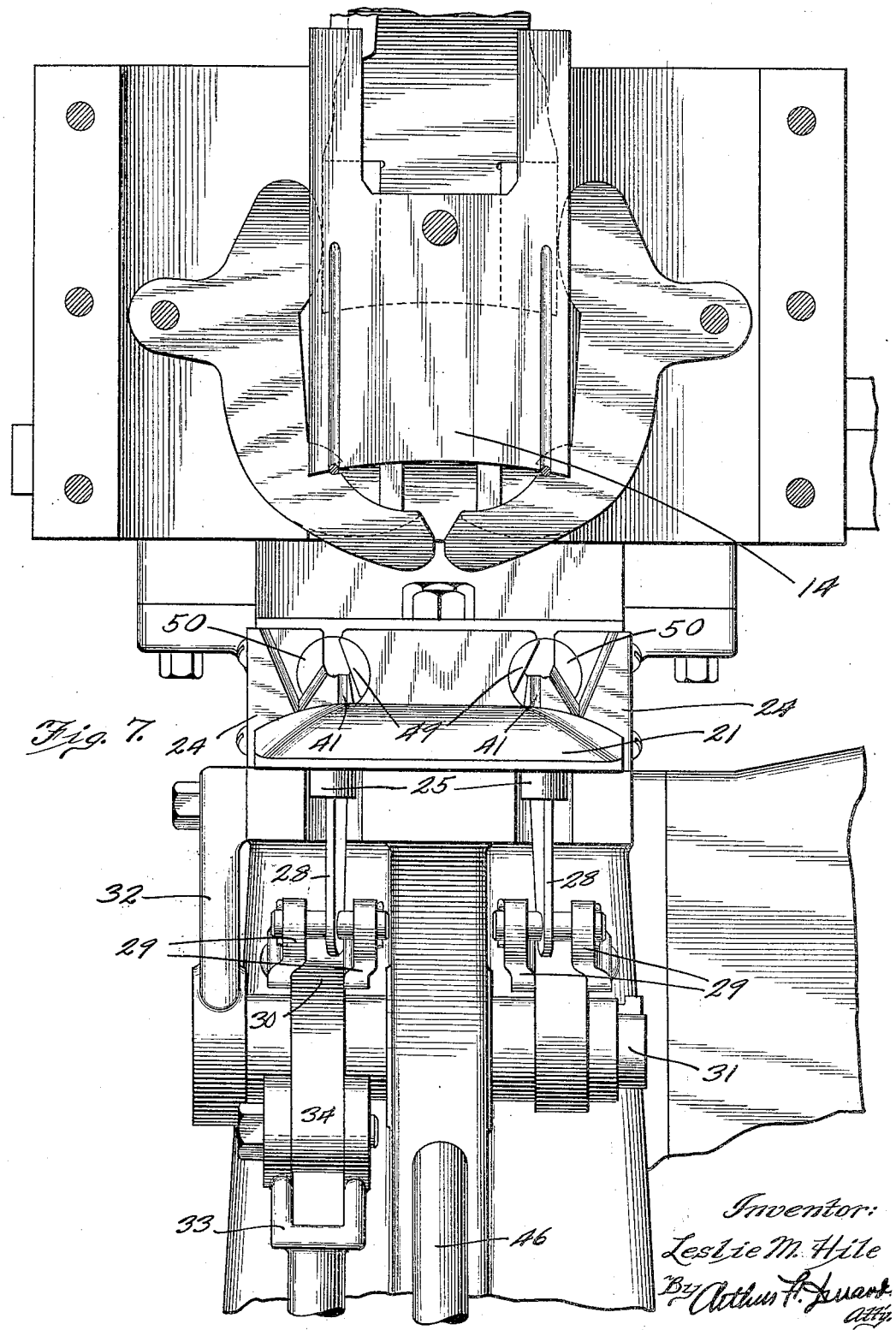

May 2, 1933.  L. M. HILE  1,907,355
BASKET HANDLE MACHINE
Filed Sept. 5, 1931  8 Sheets-Sheet 6
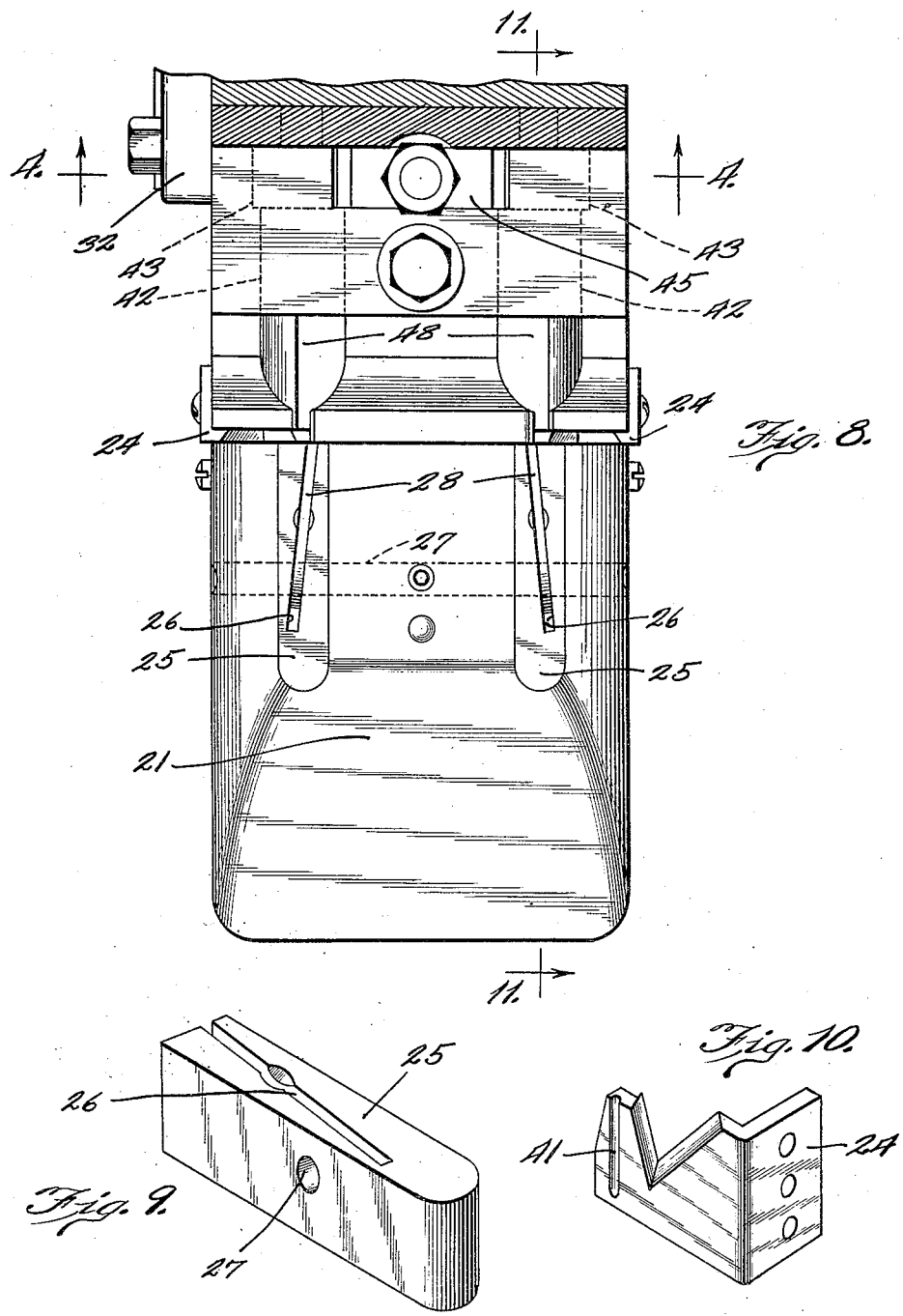

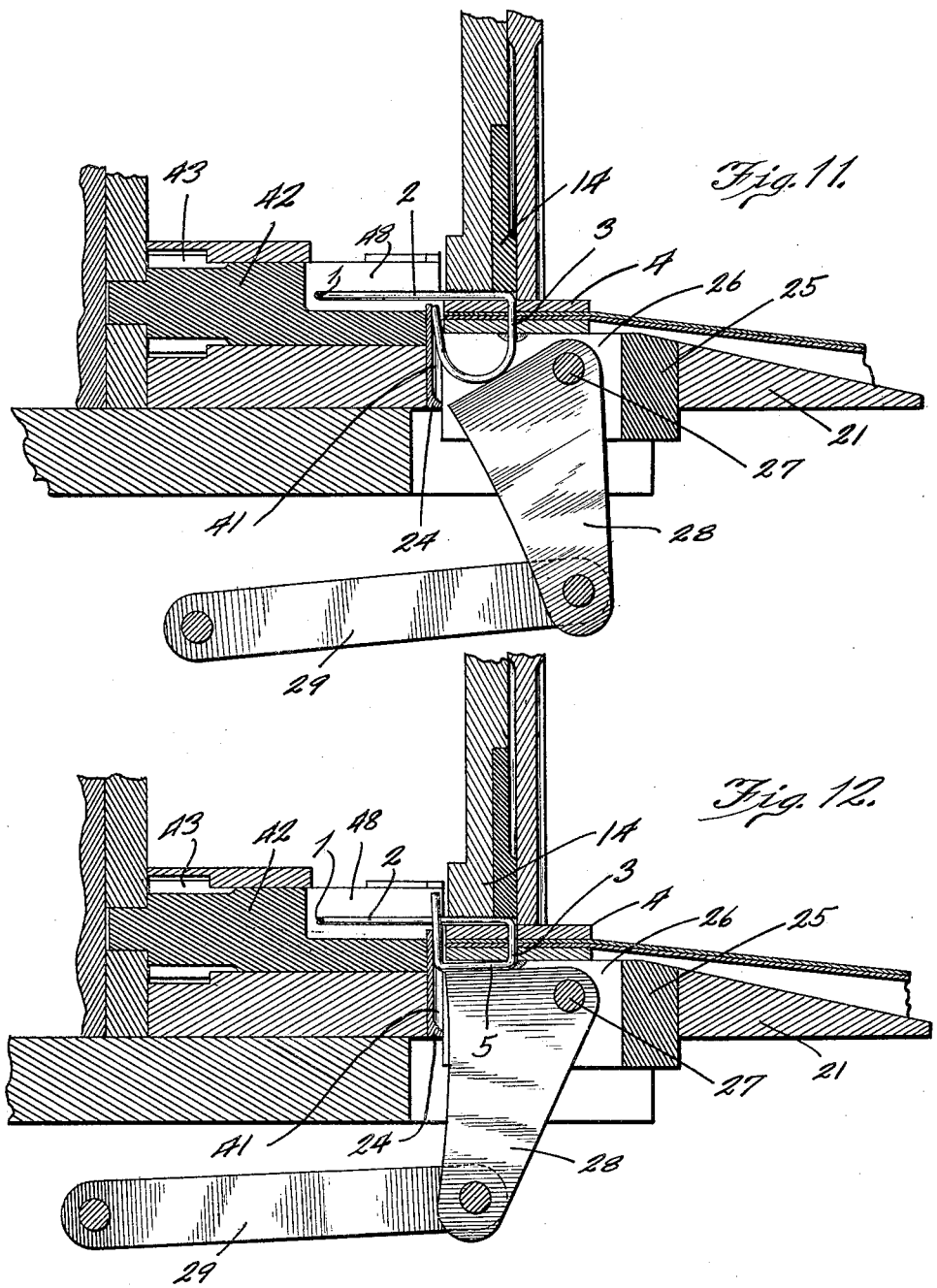

May 2, 1933.　　　　L. M. HILE　　　　1,907,355
BASKET HANDLE MACHINE
Filed Sept. 5, 1931　　　8 Sheets-Sheet 8
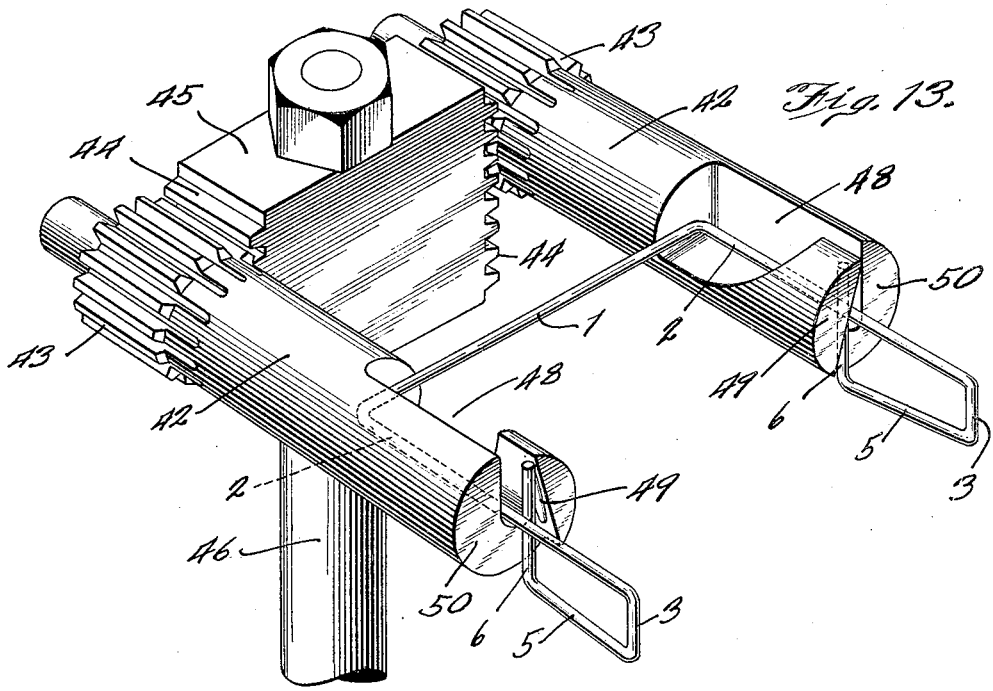
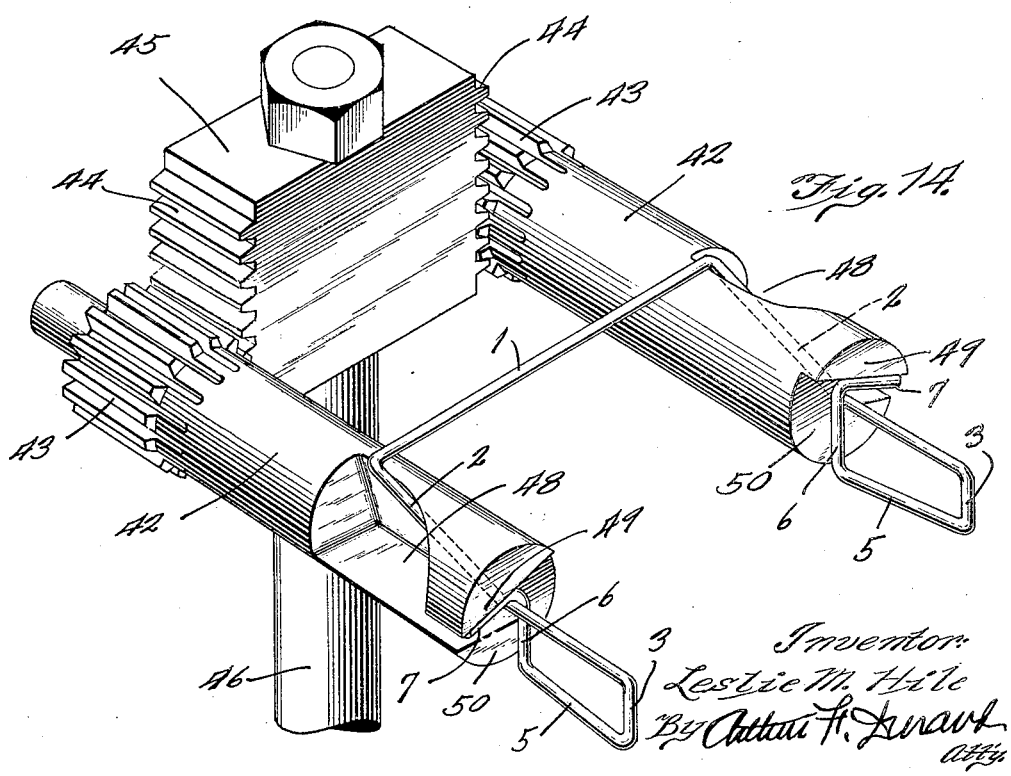

Patented May 2, 1933

1,907,355

UNITED STATES PATENT OFFICE

LESLIE M. HILE, OF BENTON HARBOR, MICHIGAN

BASKET HANDLE MACHINE

Application filed September 5, 1931. Serial No. 561,410.

The invention relates to machines for making and attaching wire handles to baskets, such as ordinary bushel and half-bushel baskets.

Generally stated, the object of the invention is to provide a novel and improved construction and arrangement whereby the wire handle is inserted through the rim of the basket, and whereby the end portions of the handle are then bent over the upper edge of the basket rim, and are then bent around the legs or side portions of the bail-shaped handle, whereby to insure an attachment of the handle in such a manner that it may be bent outwardly and then back again, as in securing a basket cover in place, without danger of loosening the handle in its bearings in the basket rim, and without danger of rocking any portion of the handle that might injure the fruit or other contents of the basket.

It is also an object to provide certain details and features of construction tending to increase the general efficiency and the desirability of a basket handle machine of this particular character.

To the foregoing and other useful ends, the invention consists in matters hereinafter set forth and claimed, and shown in the accompanying drawings in which—

Fig. 3 is a front elevation of said machine.

Fig. 4 is a detail section of a portion of the clinching mechanism of said machine.

Fig. 7 is a section on line 7—7 in Fig. 6 of the drawings.

Fig. 8 is a horizontal section on line 8—8 in Fig. 6 of the drawings.

Fig. 9 is a perspective of one of the elements of the handle forming mechanism.

Fig. 10 is a perspective of another element of the handle forming and attaching mechanism.

Fig. 11 is a detail sectional view showing one stage of the operation of attaching the wire handle to the basket.

Fig. 12 is a similar view showing another stage of said handle attaching operation.

Fig. 13 is a perspective of a portion of the handle attaching mechanism, showing one stage of the general operation of bending and attaching the wire handle to the basket rim.

Fig. 14 is a similar view showing the final stage of said handle attaching operation.

Figure 1:
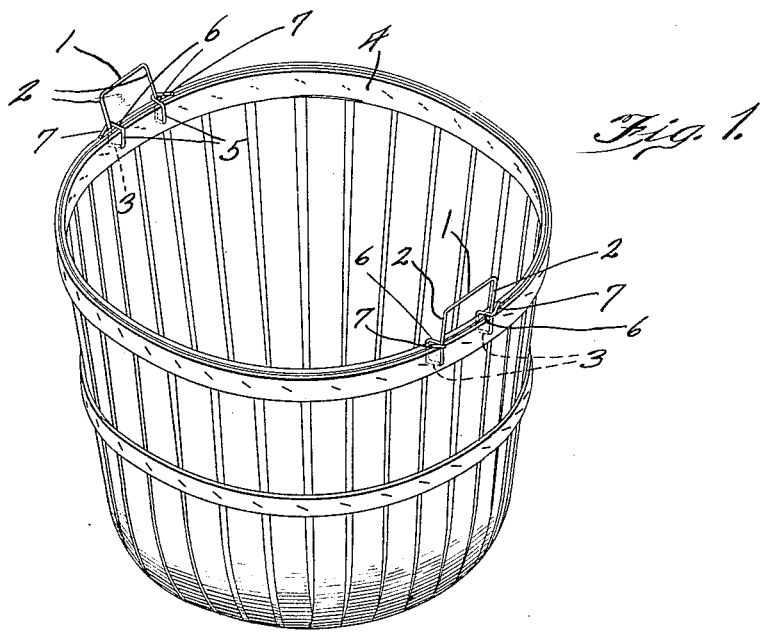
Fig. 1 is a perspective of a basket provided with handles of the kind that are made and secured to the basket by machinery embodying the principles of the invention.
Figure 2:
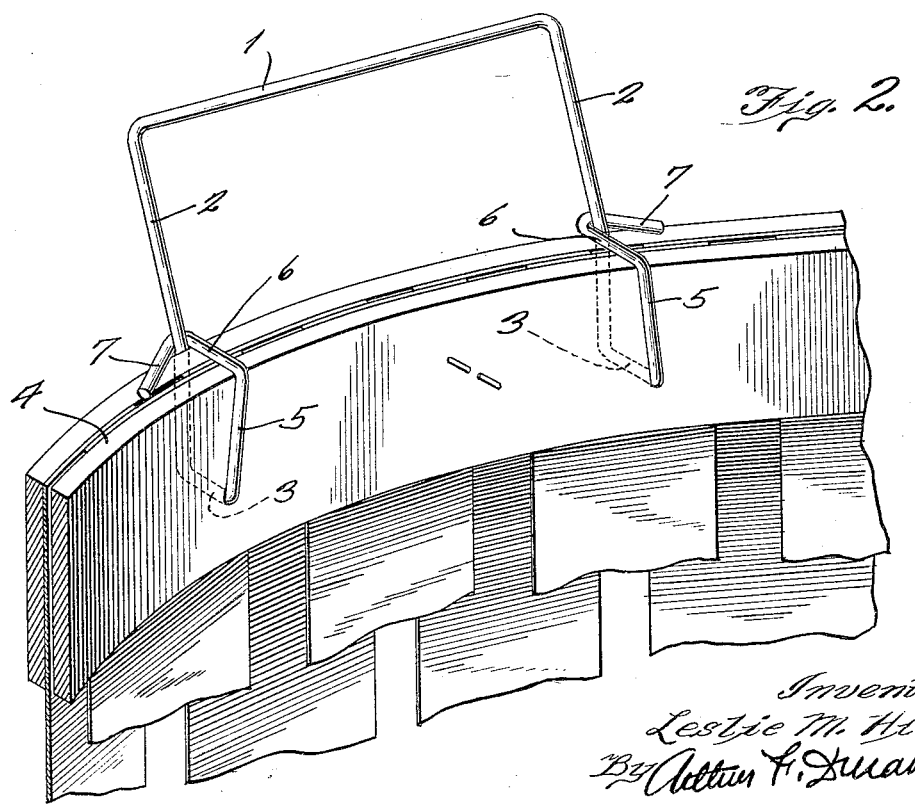
Fig. 2 is a perspective of said handle, and the adjacent portion of the basket.

Referring to Figs. 1 and 2, it will be seen that the wire handle to be attached to the basket has an upper horizontal portion 1, legs or side portions 2 that extend downwardly outside of said rim, bottom or horizontal portions 3 that extend through the basket rim 4, inside upright portions 5 that rest against the inner side of the basket rim, top portions 6 that extend across the upper edge of the basket rim, and final end portions 7 that are hooked around the legs or side portions 2 of the handle. In this way the handle is securely attached to the basket rim, in such a manner that the upper portion of the handle can be bent outwardly and then back again, as in securing a basket cover in place, without loosening the handle in its bearings in the basket rim, and without danger of rocking any portion of the handle that might injure the fruit or other contents of the basket.

Figure 5:
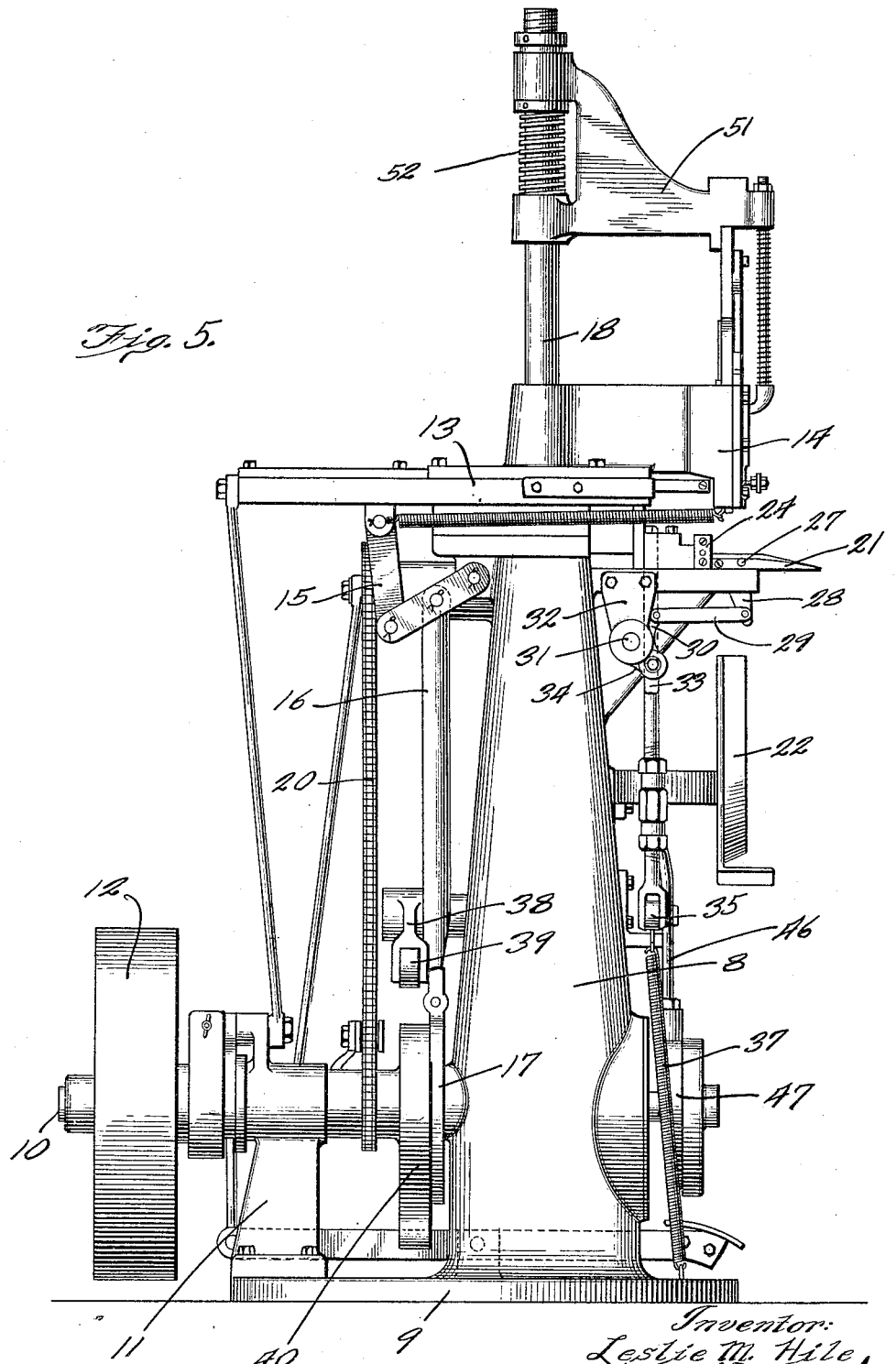
Fig. 5 is a side elevation of said machine.

Referring to Fig. 5, it will be seen that the machine has a pedestal 8 formed with a base 9 of any suitable character, there being a driving shaft 10 supported in the bracket bearing 11, and in said pedestal, provided with a pulley 12 to communicate power to the machine.

At its upper end the pedestal 8 is provided with mechanism 13, of well-known or suitable form, for cutting off a length of wire and bending it into bail-shape, and for delivering this bail-shaped preliminary handle blank to the handle driving mechanism 14, which is disposed vertically at the front of the machine, and which is of well-known or any suitable form. Handle forming and driving devices of this kind are well-known, and do not require further description. The mechanism 13 is reciprocated horizontally by the connections 15 and 16 that are operated by the eccentric device 17 on the shaft 10 previously mentioned. The vertical reciprocation of the handle driving mechanism 14 is caused by the up and down reciprocation of the rod 18 that extends downwardly in the pedestal and is operated by means of any suitable character on the shaft 10 within the pedestal. The wire is fed to the mechanism 13 by any suitable means, such as the feed rolls 19 (see Fig. 3), which latter may be operated by a sprocket chain 20 leading to a sprocket on the shaft 10. There is no novelty in the portions of the machine thus far described.

Figure 6:
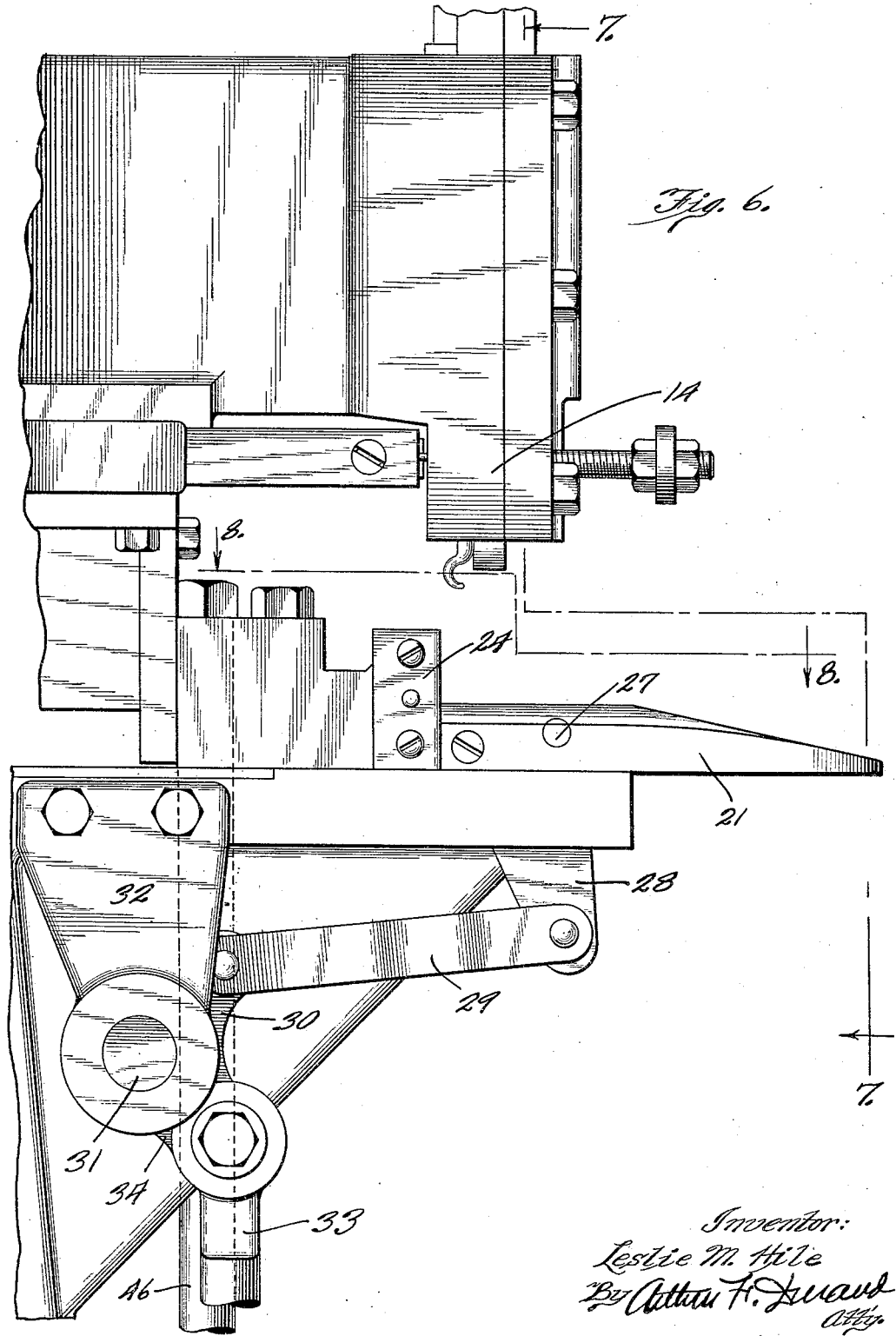
Fig. 6 is an enlarged side elevation of the upper portion of said machine.

At the front of the machine there is a support 21 on which the upper side of the basket is supported, with the basket rim in position to receive the handle. The lower side of the basket is supported by a supporting structure 22, with space between the portions 23 (see Fig. 3) for the basket handle that has been attached to the basket. A gauge or stop 24 engages the edge of the basket rim, to accurately position the basket to receive the handle. The support 21 is provided with two inset blocks 25, each block being provided with a slot 26 in which is pivoted at 27 the clinch block 28, it being observed that the slots 26 converge toward each other, when viewed from above, as shown in Fig. 8 of the drawings. Links 29 connect the clinch blocks 28 to arms 30 on the shaft 31, which latter is supported in a bracket bearing 32, as shown in Fig. 6 of the drawings. The vertically reciprocating rod or pitman 33 is connected to an arm 34 on said shaft 31, whereby vertical reciprocation of the member 33 will cause a rocking motion of the shaft 31 and a consequent tilting motion of the clinch blocks 28, in a manner that will be readily understood. The member 33 has its lower end connected to an arm 35 on the rock shaft 36 (see Fig. 3), and a spring 37 connects the end of the arm 35 with the base 9 of the machine. The shaft 36 has an arm 38 provided with a roller 39 for engagement with the cam 40 on the driving shaft 10 previously mentioned, whereby the clinch blocks 28 are actuated in properly timed relation to the other elements to bend the wire in the manner shown in Figs. 11 and 12 of the drawings.

It will be seen that the handle driver 14 inserts the end portions of the wire handle, after these end portions have been bent at right angles to the legs or side portions of the handle, in a well-known manner, through the basket rim 4, and the end portions of the handle engage the clinch blocks 28, while the latter are in their normal positions, thus deflecting the wire around and over the edge of the basket rim, as shown in Fig. 11 of the drawings. For this purpose stationary deflectors 41 are disposed in position to receive the wire ends when they are deflected from the upper edges of the clinch blocks 28, thus causing the desired bending and deflection of the handle ends, in the manner shown. Thereafter, the blocks 28 are actuated upwardly, by a pull communicated thereto, through the links 29, with the result that these blocks are forced into the position shown in Fig. 12, and this in turn flattens the wire against the inner side of the basket rim and shoves each end portion of the wire across the edge of the basket rim, at points inside of the legs or side portions 2 of the handle.

Immediately in rear of the handle driver 14, as shown in Figs. 11 and 12 of the drawings, there are two cylindrical and oscillatory twisters 42 of the kind shown more clearly in Figs. 13 and 14 of the drawings. These cylindrical twisters are arranged parallel with each other, and are provided at their rear ends with pinions 43 for engagement with the racks 44 formed on the opposite sides of the vertically reciprocating block 45, which latter is secured to the upper end of the vertically reciprocating member 46. A cam device 47 (see Fig. 5), of any suitable character, on the shaft 10 previously mentioned, serves to reciprocate the member 46 in properly timed relation to the other elements of the machine. Each twister 42 is provided with a slot 48, cut away at its inner side to accommodate the upper corner portions of the handle, and each twister is provided at its outer end with a bending or clinching portion 49, which portion extends a distance beyond the face 50 of the end of the twister. When the handle is bent and shaped as shown in Fig. 12 of the drawings, the relation thereof to the said twisters is as shown in Fig. 13 of the drawings. At such time, it will be seen that the final end portions of the handle are still straight, and that these end portions rest against the inner sides of the engaging or clinching portions 49 of the twisters. Thereafter, by upward movement of the block 45, the two twisters 42 are rotated in opposite directions, and by this movement the portions 49 are operative to bend the end portions of the wire around the side portions of the handle, in the manner shown in Fig. 14 of the drawings. Also, at such time, the transverse portion of the handle is raised slightly, so that the side portions of the handle have a bend therein at the points where the wire ends are hooked around the said legs or side portions of the handle, whereby the handle is bent outwardly a distance when finally attached to the basket, as shown in Figs. 1 and 2 of the drawings.

From the foregoing, it will be seen that bending or deflecting devices co-operate with the handle driver to insert the handle ends and partially bend them in the desired manner. The final bending, to accomplish the particular or specific form of the handle, or of the method of attachment thereof, is thereafter accomplished by twisters that seize the wire ends and give them a twist in a direction to hook them around the legs or side portions of the handle, whereby the result is the secure and strong attachment of the handle in the manner shown in Fig. 2 of the drawings.

It will be understood that with the machine shown and described, one handle is first attached to one side of the basket, in the manner described, and the basket is then turned around and brought into position to have the other handle attached to the opposite side thereof. The basket is thus rotated about its axis to bring first one side and then the other into position to receive the handles, and it will be seen that the axes of the twisters 42 are parallel with the said axis of the basket, while the axis of the clinch blocks or bending devices 28 extends at right angles to the axis of the basket, and at right angles to the axes of the said twisters. The support 21, and the devices 28, it will be seen, are disposed in position to enter the basket and perform their functions inside thereof.

It will be seen that the blocks 25 are easily removable, inasmuch as the pivot pin at 27 serves not only to pivot the blocks 28 but also to key the blocks 25 in position in the support 21 in the manner shown. It will also be seen that the wire is bent to form hooks, the ends or points of the hooks being disposed outside of the legs or side portions of the handle, but the shanks of the hooks being disposed between the legs or side portions of the handle. Thus certain portions of the wire are bent into interlocking engagement with certain other portions of the wire.

Referring to Figs. 11 and 12, it will be seen that the handle driver 14 must tightly clamp the inner and outer hoops of the basket rim, and the handle itself, in stationary position, while the mechanism shown in Figs. 13 and 14 is operating to twist the wire and hook the ends thereof around the legs or side portions of the handle. For this purpose, therefore, the top arm 51 of the handle driving mechanism 14 is compensating in character, having a spring 52 on the vertical rod or shaft 18 that communicates the downward pressure to this arm. In this way, the rod or shaft 18 moves downward a slight distance, after the driver 14 has inserted the handle, thus holding the rim portion of the basket firmly clamped in position long enough to have the basket ends twisted into hook form, in the manner previously described.

What I claim as my invention is:

1. In a machine for attaching bail-shaped wire handles to baskets, by inserting the handle ends in spaced relation through the rim of the basket, at one side thereof, and by bending the handle ends into engagement with the legs or side portions of the handle, the combination of devices for simultaneously bending or deflecting the inserted handle ends toward and over the upper edge of the basket rim, and mechanism for simultaneously bending said ends in a common plane above and parallel with said edge and into interlocking engagement with said legs or side portions at points thereon in said plane.

2. A structure as specified in claim 1, said devices comprising pivoted elements for causing the initial bending or deflection of the handle ends, while these ends are being inserted, and means for operating said pivoted elements to bend the wire against the side of the rim, after said deflection thereof.

3. A structure as specified in claim 1, said devices comprising pivoted elements for causing the initial bending or deflection of the handle ends, and means for operating said pivoted elements to bend the wire against the side of the rim, together with stationary elements for engaging and deflecting the wire ends across the edge of the basket rim.

4. A structure as specified in claim 1, said devices comprising pivoted elements for causing the initial bending or deflection of the wire ends, a support for the basket, and blocks removably set in said support, each block having a slot for one of said pivoted elements.

5. A structure as specified in claim 1, said mechanism comprising a pair of rotary elements having means for engaging and bending the wire ends away from each other, in the same plane, and around the legs or side portions of the handle.

6. A structure as specified in claim 1, said mechanism comprising a pair of rotary elements having means for engaging and bending the wire ends around the legs or side portions of the handle, together with a double rack and pinion means for oscillating said elements in opposite directions.

7. A structure as specified in claim 1, said mechanism comprising movable elements for engaging and bending the wire ends away from each other, in the same plane, and around the legs or side portions of the handle, and means for operating said elements in opposite directions.

8. A structure as specified in claim 1, said mechanism comprising a pair of rotary twisters arranged parallel, with their axes extending parallel with the axis of the basket, said twisters having end portions adapted to engage and bend the wire ends into hook form, around the legs or side portions of the handle, with the end of the hook disposed over the edge of the basket rim.

9. A structure as specified in claim 1, said mechanism comprising a pair of rotary twisters arranged parallel, with their axes extending parallel with the axis of the basket, said twisters having end portions adapted to engage and bend the wire ends into hook form, around the legs or side portions of the handle, with the end of the hook disposed over the edge of the basket rim, said twisters being operative to bend the wire ends away from each other, whereby the ends of the hooks are disposed outside of the handle legs or side portions, while the shanks of said hooks are disposed between said legs or side portions.

10. A structure as specified in claim 1, said devices being adapted to bend the handle end portions into position between the legs or side portions of the handle.

11. A structure as specified in claim 1, said mechanism being adapted to bend the extreme ends away from each other.

12. A structure as specified in claim 1, said devices being adapted to enter the basket and engage the wire ends inserted through the basket rim from the outside, and being operative during the insertion of the handle ends to deflect said ends toward the inner side of the basket rim and then over the edge thereof.

13. A structure as specified in claim 1, said mechanism having means to bend the handle outwardly relatively to the rim of the basket.

14. A structure as specified in claim 1, said mechanism comprising a pair of cylindrical twisters having longitudinal slots therein, said slots being cut away at their inner sides to accommodate the corner portions of the handle, and the forward ends of said twisters having engaging portions for engaging and bending the wire ends around the legs or side portions of the handle, together with means for oscillating said cylindrical twisters in opposite directions.

15. A structure as specified in claim 1, comprising a handle driving mechanism, and means whereby said driving mechanism is operative to firmly hold the basket rim in position during the operation of said bending mechanism.

16. A structure as specified in claim 1, comprising handle driving mechanism, and spring means for actuating said handle driving mechanism, operative to retard the return stroke of said handle driving mechanism for a period of time during the operation of said bending mechanism.

17. In a machine for attaching bail-shaped wire handles to baskets, by inserting the handle ends through the rim of the basket, the combination of devices for simultaneously bending the inserted wire ends back toward the basket rim, and mechanism for thereafter simultaneously bending the end portions of the wire into interlocking engagement with other portions of the wire.

18. A structure as specified in claim 20, said instrumentalities being operative to position the end portions of the wire between the two side portions of the handle, and said devices being operative to bend the wire ends away from each other and around the side portions of the handle, thereby to position the ends or points of the hooks upon the edge of the rim.

19. A structure as specified in claim 20, said driving means being operative to insert the handle ends inwardly through the rim of the basket, and said instrumentalities being operative to bend the end portions of the wire outwardly over the edge of the rim, and said devices being adapted to finally bend the wire ends around the side portions of the handle and into position to rest flatwise upon the edge of the rim.

20. In a machine for attaching bail-shaped wire handles to baskets, the combination of driving means for inserting the end portions of the handle in spaced relation through one and the same side of the basket, instrumentalities for bending the projecting end portions of the wire against the side of the basket rim, and across the upper edge of the rim, serving to position the end portions close to the side portions of the handle, and devices operative for thereafter bending the wire ends into hooks extending around the side portions of the handle, said devices having means for causing the ends of the hooks to extend over and rest upon the top of the rim.

21. A structure as specified in claim 20, said instrumentalities and devices being adapted and operable to position said hooks flatwise with both their shanks and ends in the same common plane above and parallel with the edge of the rim.

22. A structure as specified in claim 20, said instrumentalities and devices being duplicated at each side of the handle, and said devices being operable in unison about parallel axes to simultaneously bend the end portions of the handle in the manner stated.

23. A structure as specified in claim 20, said devices being adapted and operable to simultaneously bend the wire ends away from each other in the same plane.

24. A structure as specified in claim 20, said devices being adapted and operable to bend the wire ends by displacement thereof simultaneously about parallel axes formed by the side portions of the handle, whereby the hooks are formed simultaneously in the same plane.

25. In a machine for inserting wire handles in basket rims, the combination of driving means for inserting the parallel wire end portions through the basket rim, means for bending the projecting wire end portions toward and across the upper edge of the basket rim, instrumentalities having rotary motion about axes coincident with the portions of the sides of the handle that rest against the outer side of the basket rim, thereby to twist the wire ends into hook form around the handle side portions.

26. A structure as specified in claim 25, said instrumentalities being operative to bend the wire ends away from each other, to position them obliquely on the upper edge of the basket rim.

27. A structure as specified in claim 25, said instrumentalities being adapted to position the wire ends obliquely on the top of the basket rim.

Specification signed this 22nd day of August, 1931.

LESLIE M. HILE.